US010061657B1

(12) United States Patent
Chopra et al.

(10) Patent No.: US 10,061,657 B1
(45) Date of Patent: Aug. 28, 2018

(54) APPLICATION INTELLIGENT SNAPSHOT BACKUPS

(71) Applicant: EMC Corporation, Hopkinton, MA (US)

(72) Inventors: Shelesh Chopra, Bangalore (IN); John Rokicki, Hopkinton, MA (US); Vladimir Mandic, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 80 days.

(21) Appl. No.: 15/078,688

(22) Filed: Mar. 23, 2016

(51) Int. Cl.
*G06F 11/00* (2006.01)
*G06F 11/14* (2006.01)

(52) U.S. Cl.
CPC ...... *G06F 11/1461* (2013.01); *G06F 11/1451* (2013.01)

(58) Field of Classification Search
CPC .......................... G06F 11/1461; G06F 11/1451
See application file for complete search history.

(56) References Cited

U.S. PATENT DOCUMENTS

| | | | | |
|---|---|---|---|---|
| 7,509,468 B1* | 3/2009 | Dalal | ............... | G06F 11/1458 711/152 |
| 7,587,565 B1* | 9/2009 | Bingham | ............ | G06F 11/1464 711/161 |
| 8,762,341 B1* | 6/2014 | Mahajan | ............. | G06F 11/1448 707/640 |
| 8,972,352 B1* | 3/2015 | Roche | ................. | G06F 11/1461 707/640 |
| 9,552,259 B1* | 1/2017 | Chopra | ............... | G06F 11/1461 |
| 9,632,875 B2* | 4/2017 | Raichstein | ......... | G06F 11/1461 |
| 2008/0005204 A1* | 1/2008 | Prus | ..................... | G11B 27/002 |
| 2008/0046483 A1* | 2/2008 | Lehr | ................... | G06F 11/1451 |
| 2008/0086609 A1* | 4/2008 | Lesser | ................. | G06F 11/1458 711/162 |
| 2016/0232061 A1* | 8/2016 | Gaschler | ............. | G06F 11/1461 |

* cited by examiner

*Primary Examiner* — Bryce P Bonzo
*Assistant Examiner* — Jonathan D Gibson
(74) *Attorney, Agent, or Firm* — Womble Bond Dickinson (US) LLP

(57) ABSTRACT

Embodiments are described for dynamically modifying backup policy of an application using changes in metrics of a data set generated by the application and/or user-specified rules. Each application can have its own backup policy having a protection level that determines a frequency of backup for the application data set. An application can have an initial backup policy. An application backup policy can be based on the application type, a percent of change to the data set since the last backup, a size of the data set, or other metric. A user can specify a rule for the backup policy and protection level for the application. The backup policy or protection level can be dynamically updated in response to changes in the data set or a user-specified rule, on a per-application basis.

21 Claims, 8 Drawing Sheets

| Application Based Policy |||
| --- | --- | --- |
| Application 301 | Protection 310 | Backup Schedule 315 |
| Oracle | Platinum | Every 15 minutes |
| SAP | Platinum | Every 15 minutes |
| DB2 | Silver | Every 8 hours |
| SQL Server | Gold | Every 4 hours |
| File system | Bronze | Once every day |

FIG 3A

| I/O Rate Policy |||
| --- | --- | --- |
| I/O Change 302 | Protection 310 | Backup Schedule 315 |
| > 15%/hour | Platinum | Every 15 minutes |
| > 5%/30 mins. | Platinum | Every 15 minutes |
| < 10%/day | Silver | Every 8 hours |
| < 10%/4 hours | Gold | Every 4 hours |
| < 2%/day | Bronze | Once every day |

FIG 3B

| User Policy |||
| --- | --- | --- |
| Data Storage 303 | Protection 310 | Backup Schedule 315 |
| data > 1 terabyte | Platinum | Every 15 minutes |
| 500GB < data ≤ 1 terabyte | Gold | Every 4 hours |
| 100 GB < data ≤ 500 GB | Silver | Every 8 hours |
| 0 GB < data ≤ 100 GB | Bronze | Once every day |

FIG 3C

| 605 | 610 | 615 | 620 | 625 | 630 | 635 | 640 | 645 |
|---|---|---|---|---|---|---|---|---|
| Date/Time | Client ID | Application | Policy | Protection | I/O Change | Data Set Size | Snapshot Size | % SS/DS |
| 03-01-16:1300 | 7458A77F | DB2 | Application | Gold | 16%/hour | 503 GB | 5 GB | 1% |
| 03-01-16:1301 | 7458A77F | SAP | I/O rate | Platinum | 7%/4 hours. | 250 GB | 10 GB | 4% |
| 03-01-16:1302 | 7458A77F | SQL Server | User policy | Silver | 8%/4 hours | 30 GB | 1 GB | 3% |

FIG. 6A

| 605 | 610 | 615 | 620 | 625 | 650 | 655 | 660 | 665 |
|---|---|---|---|---|---|---|---|---|
| Date/Time | Client ID | Application | Prev. Policy | Prev. Prot. | Prev. Sched. | New Policy | New Prot. | New Sched. |
| 03-01-16:1300 | 7458A77F | DB2 | Application | Gold | Every 4 hours | Application | Platinum | Every 15 mins. |
| 03-01-16:1301 | 7458A77F | SAP | Application | Platinum | Every 15 mins. | I/O rate | Gold | Every 4 hours |
| 03-01-16:1302 | 7458A77F | SQL Server | User policy | Silver | Every 8 hours | User policy | Bronze | Once per day |

FIG. 6B

| 605 | 610 | 615 | 670 | 675 |
|---|---|---|---|---|
| Date/Time | Client ID | Application | Notif. Type | Notification |
| 03-01-16:1300 | 7458A77F | DB2 | Email | On 03-01-16:1300 client 7458A77F changed protection level for application DB2 from Gold to Platinum based on an increase in the data set size. |
| 03-01-16:1301 | 7458A77F | SAP | Text | On 03-01-16:1301 client 7458A77F changed protection policy for application SAP from Application type to I/O rate type, and from Platinum level to Gold based on an decrease in the I/O change rate. |
| 03-01-16:1302 | 7458A77F | SQL Server | Log only | On 03-01-16:1302 client 7458A77F changed protection level for application SQL Server from Gold to Silver based on a decrease in the data set size. |

APPLICATION INTELLIGENT SNAPSHOT BACKUPS

TECHNICAL FIELD

This disclosure relates to the field of backing up data of a client or host computer. More specifically, the disclosure relates to the field of backup policy and protection level when backing up data from a client or host computer.

BACKGROUND

In a networked infrastructure, a host computer or virtual machine on a host computer can be backed up by a central backup server in accordance with a policy for that particular host computer or virtual machine ("client"). The policy is set up once, by hand, and does not change unless and until the policy is manually changed. The policy applies to all application data sets on the client. Different data sets may be deemed to have greater or lesser value to the owner of the data sets. For example, a business may consider email communications to be critical, requiring backups every 15 minutes. That same business may consider accounting to be less critical, requiring backups every 8 hours. In addition, a data set may change very quickly at a first point in time, indicating that a great deal of data may be lost if the data set is not backed up frequently. At another point in time, the same data set may, at a second point in time, change very little, indicating that backups could be less frequent. Current backup policies do not monitor changes in data set characteristics and dynamically update backup policies in accordance with rules to change the policies.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 3A-3C illustrate exemplary classification tables that can be generated and used by a system that utilizes application intelligent snapshot backups, in accordance with some embodiments.

FIG. 6A illustrates an exemplary application backup policy records of an application backup policy database in a system that utilizes application intelligent snapshot backups, in accordance with some embodiments.

FIG. 6B illustrates exemplary application backup policy change records of an application backup policy database in a system that utilizes application intelligent snapshot backups, in accordance with some embodiments.

FIG. 6C illustrates an exemplary notification records of an application backup policy database in a system that utilizes application intelligent snapshot backups, in accordance with some embodiments.

DETAILED DESCRIPTION

Figure 1:
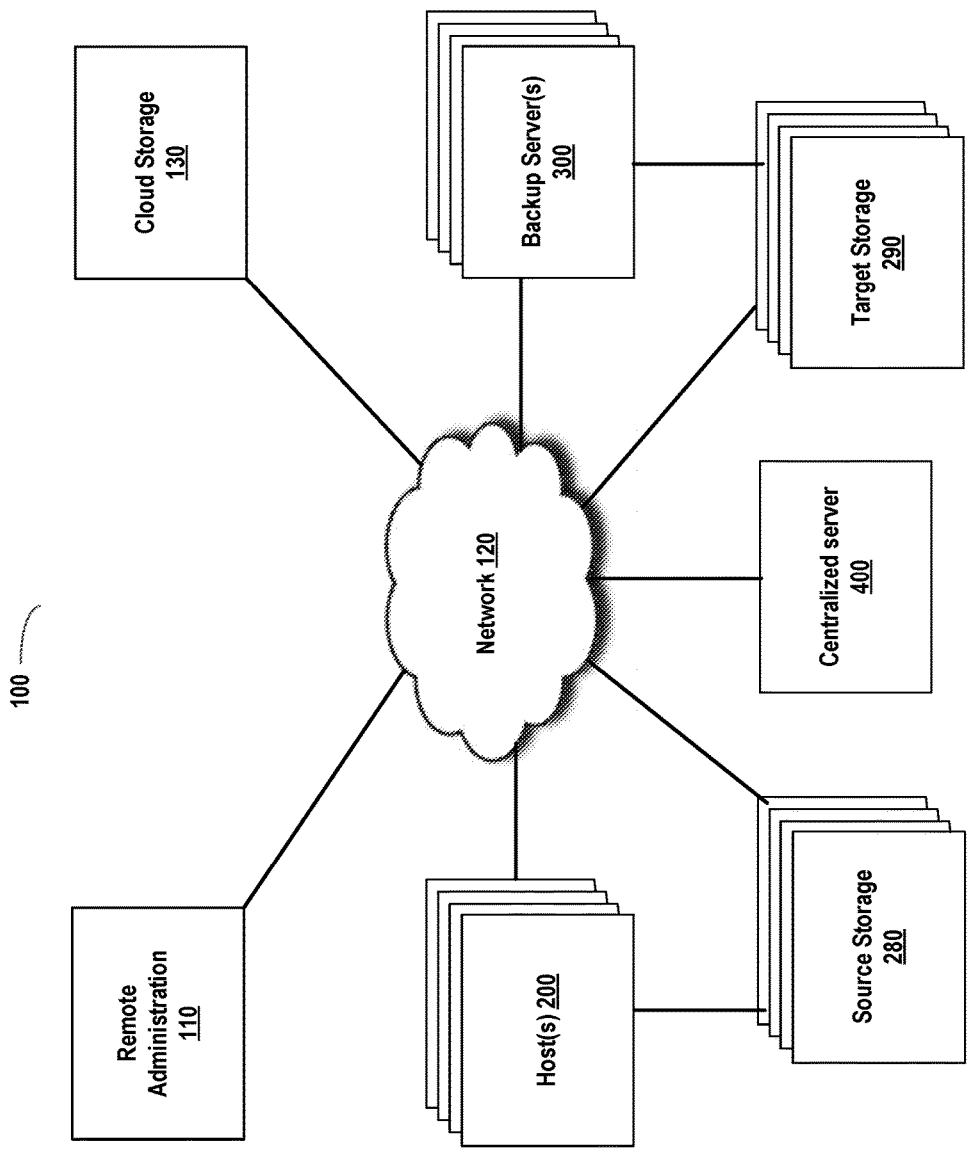
FIG. 1 illustrates, in block diagram form, an overview of a computing infrastructure that can utilize application intelligent snapshot backups in accordance with some embodiments.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for dynamically updating an application backup protection policy having a protection level for an application on a client. A client can be a particular virtual machine running on a host computer. In an embodiment, a client can be host computer. A dynamic protection policy engine can determine whether a backup policy for a an application on a client should be updated, based upon one or more rules and one or more backup data metrics. When an application backup policy and/or protection level is updated, a notification can be generated indicated a basis for the change. A backup schedule for the client and application can be updated. If an updated backup schedule for a client an application indicates that it is time to perform a backup of the application on the client, the backup can be performed.

When a backup is to be initiated for a particular client device, a dynamic protection policy engine (DPPE) can call, via one or more application programming interfaces (APIs), a discovery agent on the client. The discovery agent can determine one or more applications that are installed and/or running on the client device. The list of applications can be returned to the DPPE. For each application in the list of applications on the client, the DPPE can call a backup API for the application to obtain information about a data set generated by the application. The information can include a size of the data set, a quantity of input/outputs (I/Os) performed on the data set since a last backup, or an analysis of one or more snapshots taken during a previous backup of the data set. The analysis of the snapshots can indicate a ratio of changed data in the data set to a size of the data set. The information about the data set can be used to determine whether a current backup policy and/or protection level should be changed. For example, the information can be used to determine that a current backup protection policy and/or protection level backups up the data set very frequently, such as every 15 minutes, when in fact the snapshots and data set information indicate that the data set has changed very little. In this circumstance, the protection level could be reduced to, e.g., backups every hour instead of every 15 minutes. Conversely, if the snapshots and data set information indicate that a high proportion of the data set is changing between each backup, that the protection level should be increased from, e.g. every 8 hours to every hour. Obtaining and analyzing snapshots of a data set and other information about the data set can be termed, "application intelligent snapshot backups."

Any of the above functionality can be embodied on a non-transitory computer-readable medium programmed with executable instructions that, when executed, perform the method. A system can be programmed with executable instructions that, when executed by a processing system that includes at least one hardware processor, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

FIG. 1 illustrates, in block diagram form, an overview of a computing infrastructure 100 that can utilize application intelligent snapshot backups in accordance with some embodiments.

A computing infrastructure 100 that can utilize application intelligent snapshot backups can include one or more host devices 200 and one or more storage appliances 280 and 290, a central server 400 coupled to a network 120 and one or more backup servers 300 coupled to the network 120. A remote administration module 110 can also be coupled to one or more hosts 200, the storage appliance(s) 280, and the backup server 300 via network 120. Hosts 200, storage appliance(s) 280 and 290, central server 400, backup servers 300, and remote administration module 110 can also be coupled to a one or more cloud storage services 130. Host(s) 200 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of host(s) 200 may be a primary storage system (e.g., local data center) that provides storage to other local clients, which may periodically back up the content stored therein to a backup storage system (e.g., a disaster recovery site or system), such as backup server 300 or target storage system 290. Network 120 may be any type of networks such as a local area network (LAN), a wide area network (WAN) such as the Internet, a fiber network, a storage network, or a combination thereof, wired or wireless. Components of an example host device 200 can be as described with reference to FIG. 8, below.

Host 200 can backup or restore one or more application data sets of a virtual machine on the host 200 to or from the backup server 300. Backup server 300 can, in turn, opt to store all or a portion of the backed up application data sets to cloud storage 130 or to target storage 290. Applications can be e.g., SAP, DB2, SQL Server, Exchange, Sharepoint® or other application. An application can have its own backup component that facilitates backup of the application to target storage 290, backup server 300, or cloud storage 130. The backup component can have a backup application programming interface (API) that can be called to invoke a backup of the application data set and/or to return metrics about a backup of the application data set.

A storage appliance 280 can comprise a large number of disks, such as EMC® VMAX 400K with up to 5,760 hard drives. In an embodiment, one or more storage appliances 280 can form a part of a host 200. In an embodiment, a virtual disk can be a raw virtual disk mapped to a one or more portions of storage. A portion of storage can comprise one or more logical unit numbers (LUNs) of a single physical disk or one or more physical disks in a storage appliance 280. In an embodiment, a raw disk can be configured to use virtual mapping to one or portions of storage, such that the portions of storage can be snapshot before a backup. In an embodiment, a raw virtual disk can be physically mapped to one or more portions of storage.

A backup of a client application data set to a target storage 290 or backup server 300 can be initiated by a user of the client, a remote administrator 110, or by a backup policy on backup server 300. In an embodiment, scheduled backups can be initiated by backup server 300. Backup server 300 can initiate a backup or restore of a client application data set on host 200 in accordance with one or more backup policies each associated with client and an application on the client/host 200. For example, a policy for a virtual machine on host 200 can be that a full backup of a Sharepoint® database is performed every Friday evening.

A backup of an application data set on a client can include an operation that takes a snapshot of the application data set on the client. An analysis of the snapshot of the application data, and of historic backup data, can indicate whether a current backup policy for the application data on the client is too frequent, appropriate, or should be more frequent. Data that changes very little between backups can be snapshot and backed up less frequently. Data that changes a great deal between backups can be snapshot and backed up more frequently to ensure protection of the application data set. Updating of a client application data set backup policy is discussed in further detail below.

Figure 2:
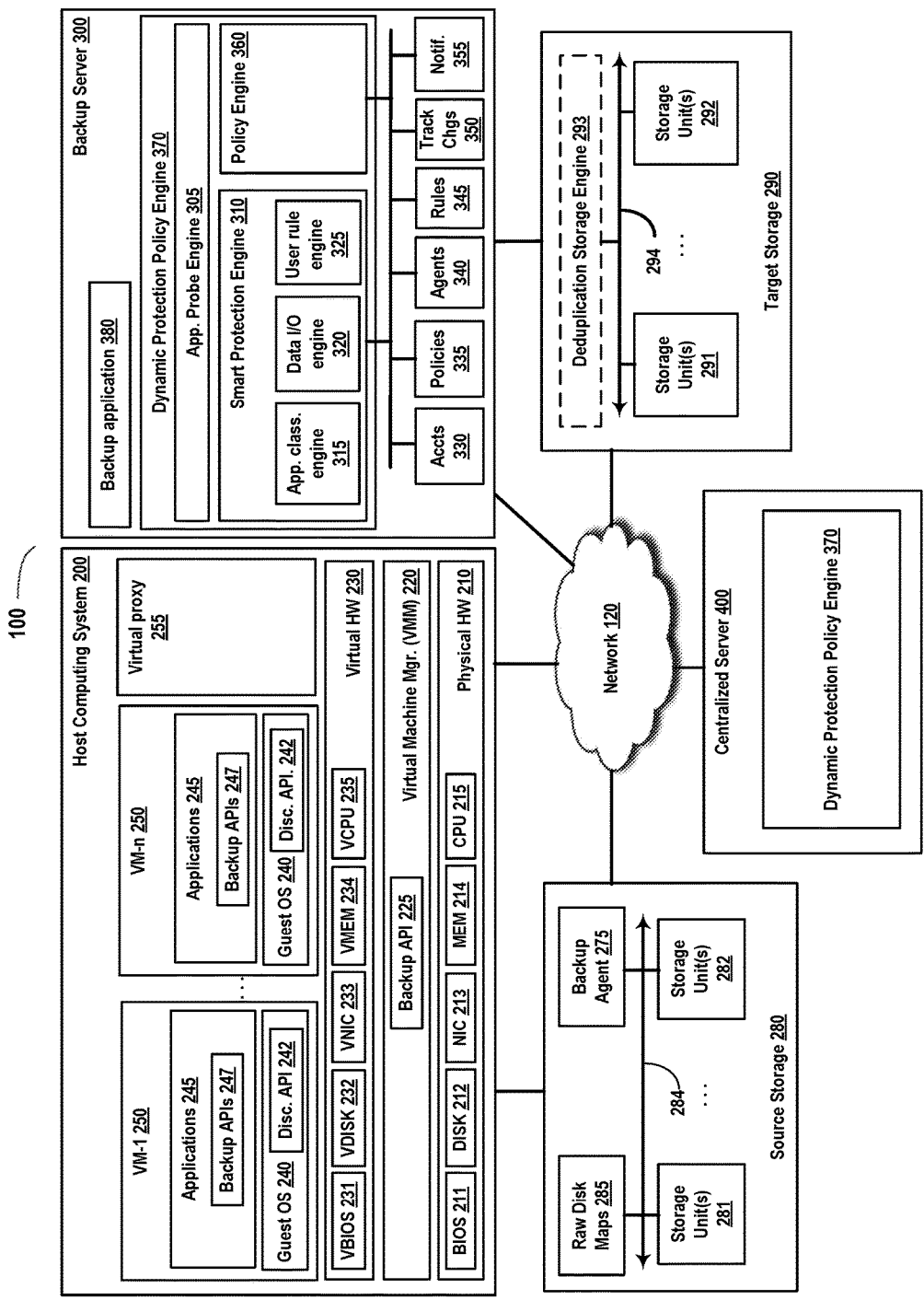
FIG. 2 illustrates, in block diagram form, a detailed view of a computing infrastructure that can utilize application intelligent snapshot backups, in accordance with some embodiments.

FIG. 2 illustrates, in block diagram form, a detailed view of a computing infrastructure 100 that can utilize application intelligent snapshot backups, in accordance with some embodiments.

A virtual infrastructure 100 can include one or more host computing systems 200 ("host"), a backup server 300, a centralized server 400, a source storage 280, and a target storage 290. In an embodiment, these components can be communicatively interconnected via network 120.

Network 120 can be any type of network such as a local area network (LAN), a wide area network (WAN) such as Internet, a corporate intranet, a metropolitan area network (MAN), a storage area network (SAN), a bus, or a combination thereof, wired and/or wireless networks.

A client having an application with an application data set to be backed up can be host 200 or a virtual machine 250 on the host 200 (interchangeably, "client"). A host 200 can include physical hardware 210, a virtual machine manager (VMM) 220, virtual hardware 230, one or more virtual machines (VM) 250, and one or more virtual proxy nodes (VP) 255.

Physical hardware 210 can include a physical basic input-output system (BIOS) 211, one or more physical disks or storage devices 212, one or more network interface cards (NIC) 213, memory 214, and one or more hardware processors or CPUs 215. Host 200 can be implemented in accordance with the computing system described with reference to FIG. 8, below.

Host 200 can include virtualization machine manager (VMM) 220 that provides a virtualization abstraction layer to support one or more virtual machines (VMs) 250 on host 200. Host 200 can further include virtual hardware 230 that can corresponds to physical hardware 210, such as a virtual BIOS 231, one or more virtual storage devices (VDISK) 232, one or more virtual network interface cards (VNIC) 233, virtual memory 234, and one or more virtual processors or CPUs 235.

In an embodiment, a virtual BIOS 231 identifier within the virtual hardware 230 can provide a portion of a universally unique identifier (UUID) for virtual machine 250 for purposes of performing the functionality described herein. In an embodiment, a virtual machine 250 UUID can be persistent with a particular virtual machine 250, even if the virtual machine 250 is moved ("migrated") to a different host computing device 200.

VM 250 can include a guest operating system (OS) 240. VM 250 Can further include an application discovery application programming interface (API) 242 that can discover one or more applications 245 that run on the VM 250. Each application 245 can include a backup API 247 that interfaces to the application data generated by the application 245. Backup API 247 also access meta data about application data that has been backed up, or is ready to be backed up. Meta data can indicate a current size of the application data set, a percentage of the application data set that has changed since a last backup, a number of inputs and outputs (I/O's) performed on the data set since the last backup, and other information about one or more backups of the application data set.

In an embodiment, host 200 can further include a storage manager or storage controller (not shown) configured to manage storage resources of host 200, such as, for example, storage space and processing resources (e.g., processor, memory, network resources). The storage manager or controller may be accessed by an administrator of management console or server 110 (as shown in FIG. 1) remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Source storage 280 can include any type of server or cluster of servers. For example, source storage 280 may be a storage server used for any of various different purposes, such as to provide multiple users with access to shared data and/or to back up mission critical data. Source storage 280 may be, for example, a file server (e.g., an appliance used to provide NAS capability), a block-based storage server (e.g., used to provide SAN capability), a unified storage device (e.g., one which combines NAS and SAN capabilities), a near-line storage device, a direct attached storage (DAS) device, or essentially any other type of data storage device. Source storage 280 may have a distributed architecture, or all of its components may be integrated into a single unit. Source storage 280 may be implemented as part of a source storage available from EMC® Corporation of Hopkinton, Mass., such as the EMC® VMAX family of storage appliances.

Source storage 280 can contain backup logic, or "backup agent" 275 that manages both backup and restore processes within the source storage 280. Backup agent 275 can communicate with dynamic protection policy engine 370 backup server 300 to perform operations that implement backup of data from source storage 280 to target storage 290, or operations to restore data from target storage 290 to source storage 280. Source storage 280 can also contain virtual machine disk files that are the content files of the VMs 250. Source storage 280 can include, e.g. storage unit(s) 281-282. Storage units 281-282 may be implemented locally (e.g., single node operating environment) or remotely (e.g., multi-node operating environment) via interconnect 284, which may be a bus and/or a network. In one embodiment, one of the storage units 281-282 can operate as an active storage to receive and store external or fresh user data, while the other storage unit operates as a target storage unit to periodically archive data from the active storage unit according to an archiving policy or scheme. Storage units 281-282 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 281-282 may also be combinations of such devices. In the case of disk storage media, the storage units 281-282 may be organized into one or more volumes of Redundant Array of Inexpensive Disks (RAID). Note that a source storage of a client may also be called the primary storage of the client to distinguish the storage from backup source storages.

Source storage 280 can further includes raw disk mapping files 285 that map a virtual disk 232 of a virtual machine to one or more portions of storage on the source storage 280. A portion of a source storage 280 can be a logical unit number (LUN). Raw disk mapping to one or more portions of storage can be physical mapping or a virtual mapping. Source storage 280 can be coupled to backup server 300 and/or target storage 290 via network 120.

Target storage 290 can be coupled to backup server 300 either as direct attached storage (DAS) or as network attached storage (NAS) via network 120. Target storage 290 may include any type of server or cluster of servers. For example, target storage 290 may be a storage server used for any of various different purposes, such as to provide multiple users with access to shared data and/or to back up mission critical data. Target storage 290 may be, for example, a file server (e.g., an appliance used to provide NAS capability), a block-based storage server (e.g., used to provide SAN capability), a unified storage device (e.g., one which combines NAS and SAN capabilities), a near-line storage device, a direct attached storage (DAS) device, a tape backup device, or essentially any other type of data storage device. Target storage 290 may have a distributed architecture, or all of its components may be integrated into a single unit. Target storage 290 may be implemented as part of an archive and/or backup storage system such as a de-duplication storage system available from EMC® Corporation of Hopkinton, Mass.

Target storage 290 can include, but is not limited to, deduplication storage engine 293, and one or more storage units 291-292 communicatively coupled to each other. Storage units 291-292 may be implemented locally (e.g., single node operating environment) or remotely (e.g., multi-node operating environment) via interconnect 294, which may be a bus and/or a network. In one embodiment, one of the storage units 291-292 operates as an active storage to receive and store external or fresh user data, while the other storage unit operates as a target storage unit to periodically archive data from the active storage unit according to an archiving policy or scheme. Storage units 291-292 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 291-292 may also be combinations of such devices. In the case of disk storage media, the storage units 291-292 may be organized into one or more volumes of Redundant Array of Inexpensive Disks (RAID). Note that in one embodiment, backup server 300 and target storage 290 are integrated into one single system.

In response to a data file to be stored in storage units 291-292, optional deduplication storage engine 293 is configured to segment the data file into multiple segments according to a variety of segmentation policies or rules. Deduplication storage engine 293 only stores a segment in a storage unit if the segment has not been previously stored in the storage unit. In the event that a segment has been previously stored, metadata about the segment is stored enabling the reconstruction of a file using the previously stored segment. As a result, segments of data files are stored in a deduplicated manner, either within each of storage units 291-292 or across at least some of storage units 291-292. Data stored in the storage units 291-292 may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

Backup of an application data set of a virtual machine (VM) 250 on host 200 can be performed using a virtual proxy node (VP) 255 on host 200 to facilitate the backup of the virtual machine storage or one or more application data sets of the VM 250. Backup server 300 can instruct VP 255 to cause a snapshot to be taken of application data of an application on VM 250. The snapshot can then be backed up from source storage 280 to target storage 290. Backup server 300 can facilitate the backup of the snapshot to the target storage 290.

Backup server 300 can instruct source storage 280 to take the snapshot of the application data for the client. The snapshot can then be backed up from source storage 280 to target storage 290. The backup server 300 can facilitate backup of the snapshot to target storage 290. In an embodiment, backup agent 275 on source storage 280 can be called by backup server 300 via calls to VMM 220 backup API 225 to facilitate direct transfer of the snapshot from source storage 280 to target storage 290.

Backup server 300 can be a computing system as described with reference to FIG. 8, below. Backup server 300 can comprise one or more computing systems. Backup server 300 can include, but is not limited to, a dynamic protection policy engine 370, a backup application 380, and a plurality of databases, including an accounts 330 database, a policies 335 database, backup agents 340 data base, rules 345 database, change tracking database 350, and a notifications 355 database. Databases 330-355 can be implemented using any database technology including SQL Server, DB2, Microsoft Access, or others.

A backup server 300 operating as a storage system may include or represent any type of servers or a cluster of one or more servers (e.g., cloud servers). For example, storage system 300 may be a storage server used for various different purposes, such as to provide multiple users or client systems with access to shared data and/or to back up (or restore) data (e.g., mission critical data). Storage system 300 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

Dynamic Protection Policy engine (DPPE) 370 can include an application probe engine (APE) 305, a smart protection engine (SPE) 310, and a policy engine 360. Application probe engine 305 can call discovery API 242 within a VM 250 to discover the applications that may be installed and/or running on VM 250. From the results of one or more calls to discovery API 242 on VM 250, DPPE 370 can build a manifest of applications that are installed or running on VM 250. For each application in the manifest, APE 305 can call one or more APIs, e.g. backup API 247 and discovery API 242, to determine changes to the application data since the last backup. DPPE 370 can pass the manifest, and application data change information for each application, to the SPE 310. SPE 310 can classify the application data change information using one or more of an application classification engine (ACE) 315, a data I/O engine 320, or a user rule engine 325. See FIG. 6A, which is described below, for an example classification of application data change information based on rules stored in rules 345 database and policies 335 database for a particular client having an account 330. SPE 310 can pass the classified application data change information to policy engine 360 to determine whether an existing application backup policy and/or protection level for a client should be updated, based on the classified application data change information. If a backup policy and/or protection level for an application data set of a client should be changed, then a policy update record can be generated for the track changes 350 database. See FIG. 6B, described below, for examples of an application backup policy change tracking record 350. In an embodiment, policy engine 360 can cause a backup schedule (not shown) to be updated for the application data set for the application. In an embodiment, a notification can be generated into the notifications 355 database, indicating the change to the backup policy and/or protection level of a particular client for a particular application. See FIG. 6C, described below, for example notifications 355.

In an embodiment, the functionality described for the dynamic policy protection engine 370 can be implemented on a centralized server 400 instead of, or in addition to, being implemented on a backup server 300. Discovery of applications 245 on a client 200 or 250 can be offloaded to the centralized server 400 so that processing, memory, and storage resources are preserved on the backup server 300, to increase backup server 300 throughput.

Backup server 300 can coordinate with source storage 280, target storage 290, and host computing system 200 to run various backup operations. Backup application 380 may perform both backup and restore functions. Backup application 380 can communicate with discovery API 242, backup APIs 247 within VM 250 of a host 200. Backup application 380 can also communicate with backup agent 275 in source storage 280 to run various operations. Backup application 380 can further communication with backup API 225 in VMM 220. Backup application 380 can read and write backup accounts 330, backup policies 335, and backup agents 340. Accounts 330, policies 335, agents 340, rules 345, track changes 350, and notifications 355 can reside on a single storage device accessible to backup server 300, or across multiple storage devices accessible to backup server 300.

Accounts database 330 can store identifying information about a particular client, such as a textual name, a network address, a universally unique client identifier (UUID), and biographic information about the individual and/or company that owns the client. Accounts 330 can include login information to backup server 300 for users of virtual machines 250 and administrators who may access backup server 300 via remote administration module 110. Accounts 330 can be aggregated by company, by region, or other metric, such that backup policies 335 can be generated for one or more backup accounts 330 by company, by region, or other metric, such as by data center or business operating group.

Policies database 335 can include, for each application on a client, a backup policy including a backup policy type (by application, by I/O change rate, by user rule) and a protection level for the application data. A protection level can indicate a frequency that application data should be backed up. A protection level can have a textual name to indicate a frequency or range of frequencies for backup, as described with reference to FIG. 3A-3C, below. For example, platinum protection level may indicate a backup every 15 minutes and bronze protection level may indicate a backup once each data for a particular application on a client. Backup policies 335 can specify particular applications whose data gets backed up from a virtual machine 250, retention policy for the backed up data, whether the backups are incremental, full, image, or an alternating or interleaved combination of these. Backup policies 335 can further define whether data is deduplicated before storage, how quickly the storage can be retrieved for access by a virtual machine, and other policy parameters.

Agents database 340 can include a copy of agents and/or APIs, such as backup APIs 247, discovery API 242, VMM backup agent 225, or storage backup agent 275. Agents and/or APIs can be stored in agents 340 database for numerous client types, operating systems, softwares, versions of softwares, etc. In an embodiment, backup application 380 on server 300 can ensure that backup agents and APIs are current on a given client before the client begins backing up the data. Backup agents 340 can include modules that can perform general backup and restore functions and can additionally include modules that can perform specific functionality such as backing up or restoring a raw virtual disk or backing up data for a particular application. A VM 250 can request an updated version of its own discovery API 242 or a backup API 247 of a particular application. A backup agent 275 of a source storage 280 can request an updated version of itself before performing a backup or restore operation.

Rules database 345 can include rules for determining backup policy and/or protection level of a policy. Rules 345 can include user-generated rules such as, "On client XYZ, backup DB2 application data using platinum policy if the size of the data set for the application is greater than 1 terabyte." A rule can be specific to particular application on a particular client. More example rules are shown in FIG. 3C, as described below.

Track changes database 350 can track when, and why, an application policy and/or protection level for a particular client and particular application has been updated.

Notifications database 355 can store notifications to a user that a backup policy and/or protection level for a particular client for a particular application has changed. In an embodiment, the notification can further include the reason for the backup policy change for the application. Notifications can be kept in the notifications database 355, where a user can query for new notifications. Notifications can be sent by email, SMS message, text message, "Tweet," automatically printed on a printer, or other physical or electronic manner of publishing the notification.

FIGS. 3A through 3C illustrates example policy records 335 for a particular application on a particular client. Each policy record 335 has a protection level 302 and associated backup schedule timing 306. Different applications on different clients can each have different backup policy records 335 indicating a protection level 304 and backup schedule 306 for a particular application data set on a particular, identified client. Different clients can have different protection levels or backup schedules for the same application. For example, client XYZ can have platinum protection for application "Oracle" while client ABC uses gold protection for application "Oracle." Similarly, client XYZ can have platinum protection for application Oracle with a backup schedule of every 15 minutes and client ABC can have platinum protection for application Oracle with a backup schedule of every 30 minutes.

FIG. 3A illustrates example policy records 335 for a particular, named application 301. For example, a policy record 335 for application 301 "Oracle" can have a backup protection level 304 of "Platinum" indicating that the Oracle application data should be backed up every 15 minutes for this client. Another application 301 "DB2" can have a backup protection level of "Silver" indicating that the DB2 application data for this client should be backed up every 8 hours. The entire file system of a client can have a policy of "Bronze" to indicate that the file system for this client should be backed up once every day. Example policy records 335 for SAP and SQL Server are also shown in FIG. 3A with analogous descriptions for each as shown in the FIG. 3A.

FIG. 3B illustrates example policy records 335 that can be used to define a backup protection level 304 for an application data set based upon an input/output rate 302 of the application data set. For example, if the I/O change rate 302 is greater than 15% per hour, then the application can use platinum protection level 304 indicating that the application data set on an identified client associated with this policy record 335 will be backed up every 15 minutes. Similarly, an application data set that has less than 10% change in I/O rate 302 over a 4 hour period can use gold protection level 304 indicating that the application data set on an identified client associated with this policy record 335 will be backed up every 4 hours. In another example, application data set for a particular client that has an I/O change rate that is less than 2% per day can use a bronze protection level 304 indicating that the application data set on an identified client associated with this policy record 335 will be backed once every day.

FIG. 3C illustrates example policy records 335 that can be used to define a backup protection level 304 for an application based upon a user-defined policy. One example user-defined policy is to set a protection level for an application data set on an identified client based upon a size of the application data set. For example, if an application data set was previously greater than 100 gigabytes (GB) in size and less than 500 GB, then a protection level 304 for the application data set on an identified client can be silver, indicating that the application data set for the client will be backed up every 8 hours. If the size of the application data set grows to greater than 1 terabyte, then the protection level 304 can be updated to platinum level indicating that the application data set for the identified client will be backed up every 15 minutes.

Figure 4:
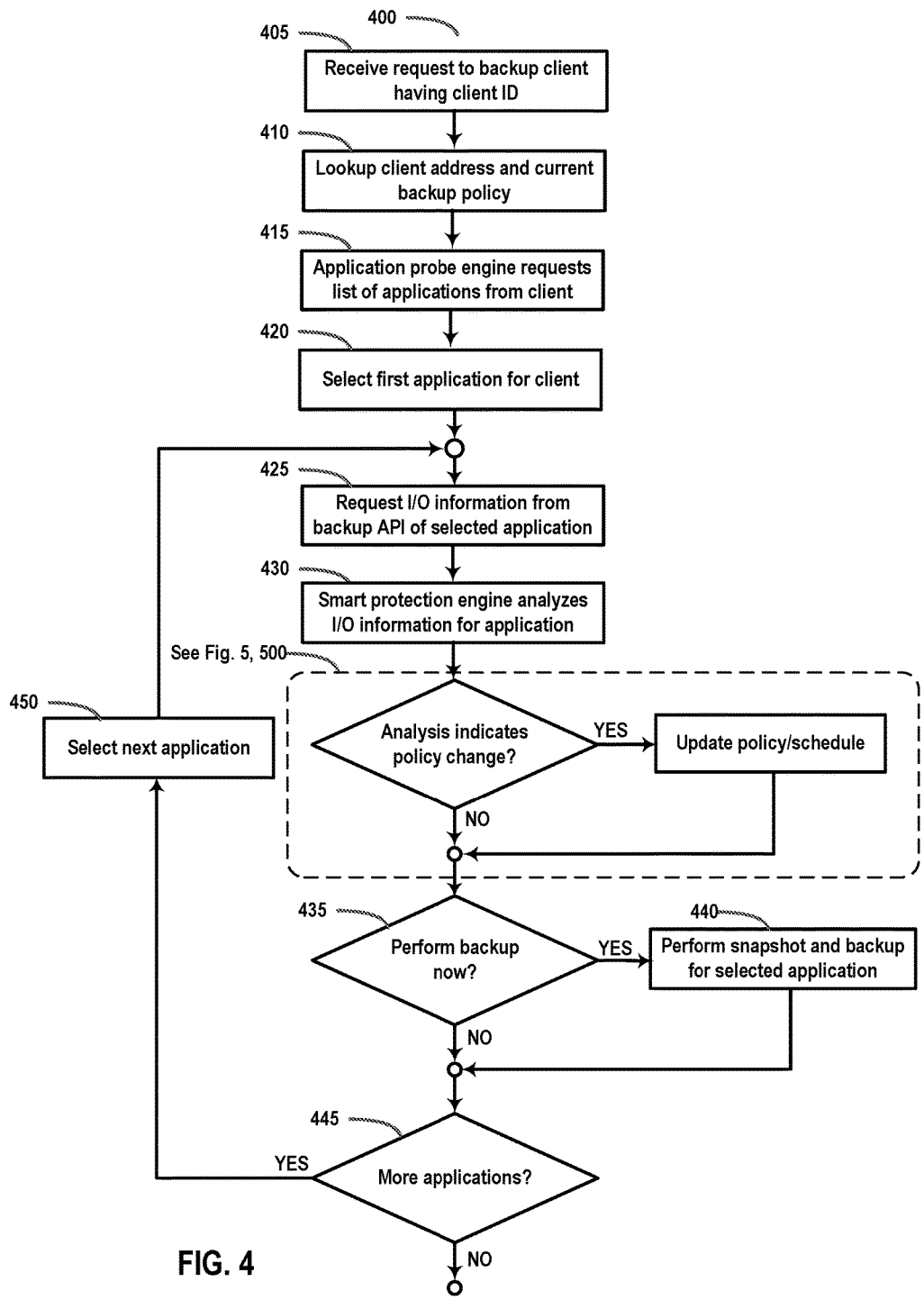
FIG. 4 illustrates, in block diagram form, a method of dynamically updating a backup policy for an application on a client in a computing infrastructure that can utilize application intelligent snapshot backups, in accordance with some embodiments.

FIG. 4 illustrates, in block diagram form, a method 400 of dynamically updating a backup policy protection level for an application on a client in a computing infrastructure that can utilize application intelligent snapshot backups, in accordance with some embodiments.

In operation 405, a backup application 380 can receive a request to backup a client having a client identifier ("identified client"). A client can have a textual name, a virtual machine identifier that is unique within a virtual infrastructure, a BIOS identifier 211 that is unique to a host 200 and made unique to a VM 250 via a virtual machine BIOS 231, or the client can have a universally unique identifier. The client can have multiple applications installed and/or running on the client. A request to backup the client can be received from a user of the client. In an embodiment, the request can be initiated by a remote administrator 110. In an embodiment, the backup request can be initiated by a backup server 300 in response to a schedule of a backup policy 335 for a particular application or for the client.

In operation 410, the client address can be looked up by the backup application 380. In an embodiment, backup application 380 can look up the client address in accounts database 330. In an embodiment, the client address can be provided in the request to backup the client.

In operation 415, application probe engine (APE) 305 can determine a list of applications installed and/or running on the identified client. In an embodiment, APE 305 can determine the list of applications on the client by calling a discovery API 242.

In operation 420, APE 305 can select a first application from the list of applications on the client.

In operation 425, APE 305 can request I/O information about the data set for the selected application from the client. In an embodiment, APE 305 can make one or more calls to a backup API 247 on the client to obtain information about the application data set to be backed up such as snapshot data, meta data about previous backups of the application data set, and meta about the application data set such as a size of the application data set or the amount of change in I/O's on the data set since a last backup. In an embodiment, the backup API 247 can be associated with the application whose data set is to be backed up. APE 305 can package the application data set I/O information, along with an identification of the application, and can send the package to the smart protection engine (SPE) 310 for classification and analysis.

In operation 430, SPE 305 can analyze and classify the I/O information about the application data set for the identified client.

In operation 500, it can be determined whether the current policy and/or protection level for the application should be updated, based upon the I/O information about the application data set and current policy and/or protection level. Details of operation 500 are described below with reference to FIG. 5.

In operation 435, it can be determined whether the application data set for the client should be backed up now. Even though, in operation 405, a request was received to backup the identified client, a current policy 335 protection level 304 for the application data set may indicate that it is not time to backup this application data set for this client. In addition, analysis of the I/O information in operation 500 may indicate that the protection level for this application data set should be lowered, e.g. from gold to silver, such that the application data set is no longer currently scheduled for a backup.

If, in operation 435 it is determined that it is currently time to backup the application data set of the selected application, then in operation 440, a snapshot can be taken of the application data set. In an embodiment, the snapshot of the application data set can comprise only changed data blocks. After the snapshot, the backup of the application data set can be either performed or enqueued for performance.

In operation 445, it can be determined whether there are more applications on the client whose application data set may need to be backed up.

If, in operation 445, it is determined that there are more applications whose application data set may need to be backed up, then in operation 450, a next application is selected and the method 400 resumes at operation 425. Otherwise, the method terminates.

Figure 5:
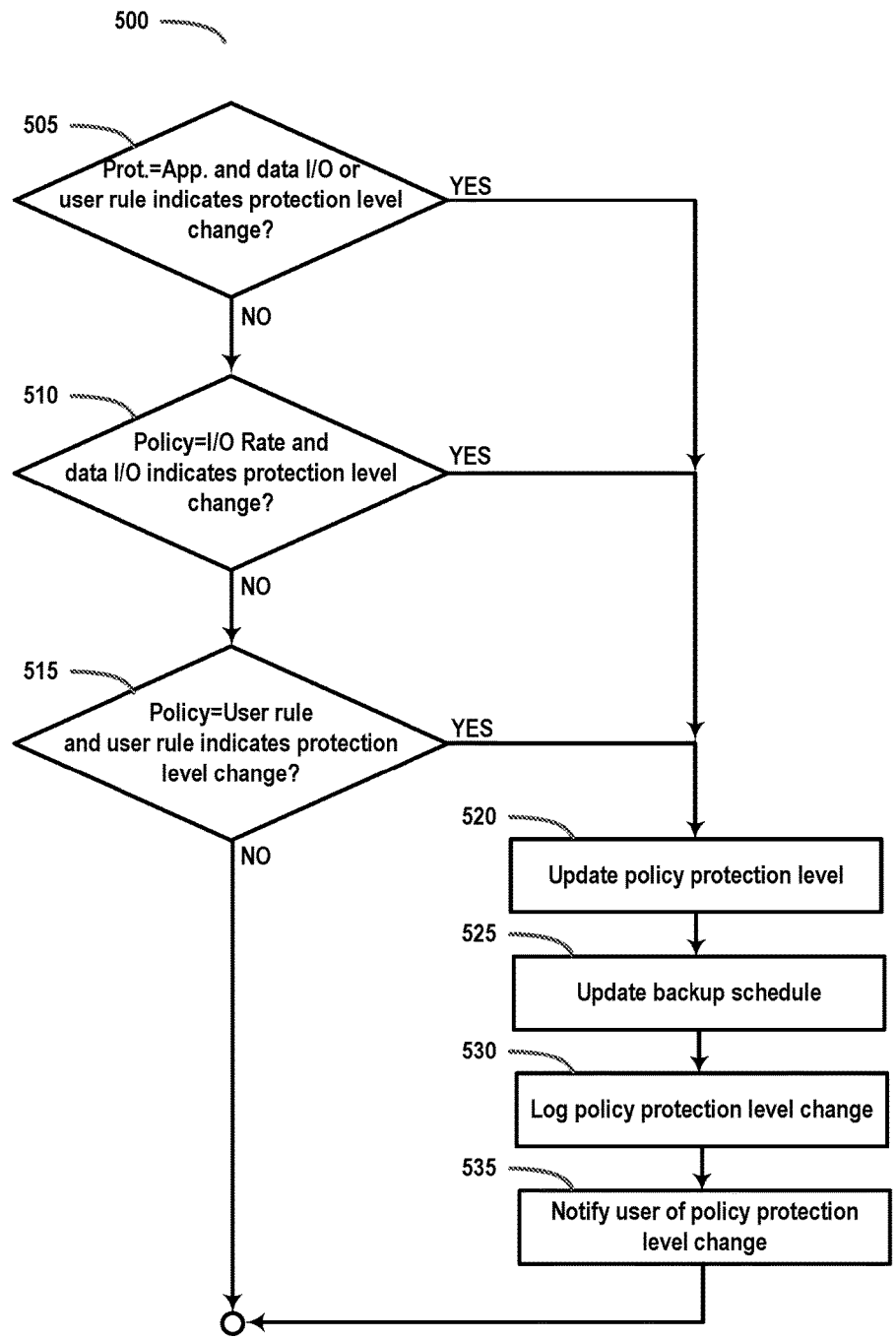
FIG. 5 illustrates, in block diagram form, a method of determining whether to dynamically update a backup policy for an application on a client in a computing infrastructure that can utilize application intelligent snapshot backups.

FIG. 5 illustrates, in block diagram form, a flow chart of a method 500 of determining whether to dynamically update a backup policy and/or protection level of a backup policy for an application on a client in a computing infrastructure that can utilize application intelligent snapshot backups. It should be noted that FIG. 5 is illustrative and non-limiting. A wide variety for rules, combinations of rules, and order of applying those rules, is contemplated. The method 500 illustrated in FIG. 5 is one example of a way to apply to the inventive concepts disclosed herein.

In operation 505, it can be determined whether a backup policy type (e.g. Application based, I/O rate based, or User Policy) is application-based and either a data I/O rate or a user rule indicates that the policy type and/or protection level 304 should be changed. If so, then the method continues at operation 520. Otherwise the method continues at operation 510.

In operation 510, it can be determined whether a backup policy type is data I/O rate and the data I/O rate indicates that the policy protection level should be changed. If so, then the method continues at operation 520. Otherwise the method continues at operation 515.

In operation 515 it can be determined whether the backup policy type for the selected application is "user rule" type and a user-defined rule indicates that the policy protection level should change. If so, then the method continues at operation 520, otherwise the method 500 ends.

In operation 520, the policy type and/or policy protection level can be changed and the backup policy record 335 for this application for this client can be updated in the policies 335 database.

In operation 525, a backup schedule for the application and client can be updated to reflect any change in backup scheduling that may have resulted from the backup policy and/or policy protection level change in operation 520. For example, the backup policy protection level may have decreased from gold to silver, indicating that a change from, e.g., backing up the selected application for the client from every 4 hours to every 8 hours. A schedule of backups can be updated to reflect the change in the backup policy protection level 304.

In operation 530, the change in backup policy and/or backup policy protection level can be logged in the track changes 350 database. An example backup policy change record 350 is described with reference to FIG. 6B, below.

In operation 535, a notification can be generated for the change in backup policy and/or backup policy protection level. Examiner backup policy change notification records are described below with reference to FIG. 6C.

FIG. 6A illustrates example backup policy records 335 in backup policy database 335. A backup policy record 335 can have a date/time stamp 605, a client identifier 610, an application identifier 615, an backup policy type 620, a backup policy protection level 625, and a plurality of application data set metrics 630-645 as returned from the discovery API 242 for a client and backup API 247 for each application, at the time that the application policy and/or policy protection level were last updated. Application data set metrics can include an I/O data change rate 630 of the application data set on the client, a data set size 635 of the application data set on the client, a snapshot size 640 of the application data set on the client in preparation for backup, and a ratio 645 of the size of the snapshot to the size of the application data set for the client.

FIG. 6B illustrates example backup policy and/or policy protection level change records 350. A backup policy change record 350 can have a date/time stamp 605, a client identifier 610, and an application identifier 615. The client identifier 610 and application identifier 615 indicate the client and application whose backup policy and/or policy protection level have changed. Fields 620, 625, and 650 indicate the previous backup policy type, policy protection level, and backup frequency, respectively, for the client 610 and application 615. Fields 655, 660, and 665 can indicate the new (changed) backup policy type, policy protection level, and backup frequency, respectively, after an update of the backup policy and/or protection level as described in FIG. 5, above.

FIG. 6C illustrates example backup policy and/or protection level change notification records 355. A backup policy change notification record can include a date/time stamp 605 indicating the date/time that the backup policy and/or policy protection level was changed. Backup policy change notification records 355 can also include a client identifier 610, application identifier 615, and a notification type 670. As described above, notification records 355 can be held in the notifications records database 355, or notifications can be pushed to the user such as by email, SMS message, text message, "Tweet," and/or hard copy print. A backup policy change notification record 355 can also indicate a notification text 675 that explains the reason for the policy and/or protection level change.

Figure 7:
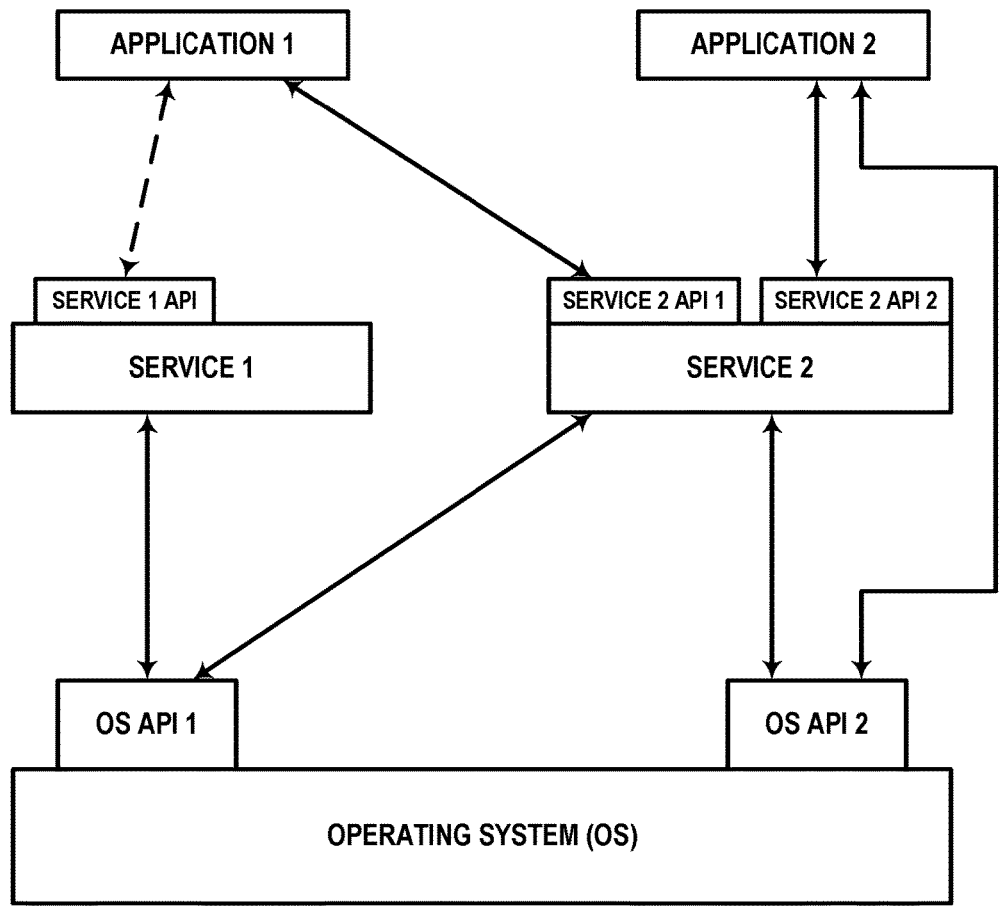
FIG. 7 illustrates an exemplary embodiment of a software stack usable in some embodiments of the invention.

In FIG. 7 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
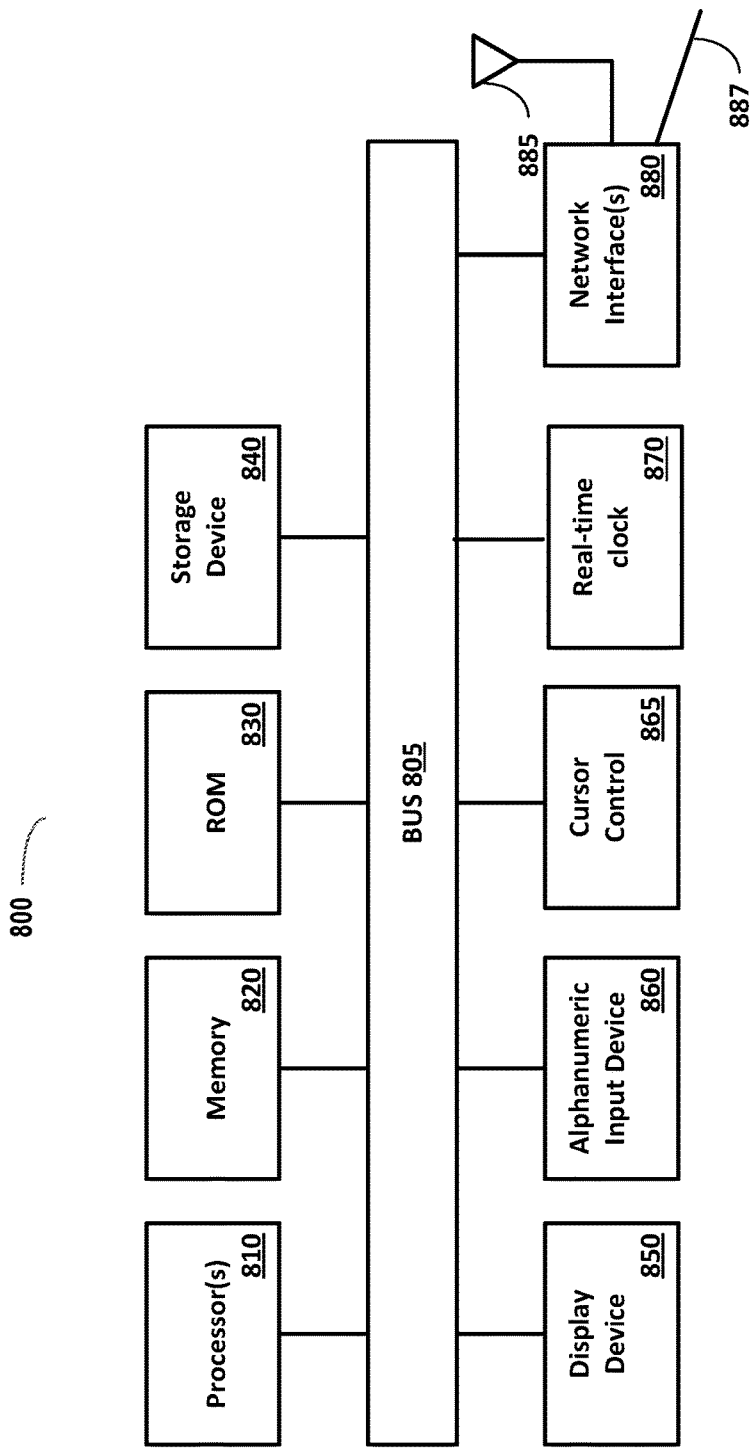
FIG. 8 illustrates, in block diagram form, an exemplary computing system for implementing concepts described herein.

FIG. 8 is a block diagram of one embodiment of a computing system 800. The computing system illustrated in FIG. 8 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 8 may be used to provide a computing device and/or a server device.

Computing system 800 includes bus 805 or other communication device to communicate information, and processor 810 coupled to bus 805 that may process information.

While computing system 800 is illustrated with a single processor, computing system 800 may include multiple processors and/or co-processors 810. Computing system 800 further may include random access memory (RAM) or other dynamic storage device 820 (referred to as main memory), coupled to bus 805 and may store information and instructions that may be executed by processor(s) 810. Main memory 820 may also be used to store temporary variables or other intermediate information during execution of instructions by processor 810.

Computing system 800 may also include read only memory (ROM) 830 and/or other static, non-transitory storage device 840 coupled to bus 805 that may store static information and instructions for processor(s) 810. Data storage device 840 may be coupled to bus 805 to store information and instructions. Data storage device 840 such as flash memory or a magnetic disk or optical disc and corresponding drive may be coupled to computing system 800.

Computing system 800 may also be coupled via bus 805 to display device 850, such as a cathode ray tube (CRT), light-emitting diode display (LED), or liquid crystal display (LCD), to display information to a user. Computing system 800 can also include an alphanumeric input device 860, including alphanumeric and other keys, which may be coupled to bus 805 to communicate information and command selections to processor(s) 810. Another type of user input device is cursor control 865, such as a touchpad, a mouse, a trackball, or cursor direction keys to communicate direction information and command selections to processor(s) 810 and to control cursor movement on display 850. Computing system 800 may further include a real-time clock 870. The real-time clock 870 may be used for generating date/time stamps for data records, computing elapsed time, and other time-keeping functions. A real-time clock 870 can be a battery-backed chipset with a settable date and time. Alternatively, a real-time clock 870 may include logic to retrieve a real-time from a network source such as a server or an Internet server via network interfaces 880, described below.

Computing system 800 further may include one or more network interface(s) 880 to provide access to a network, such as a local area network. Network interface(s) 880 may include, for example, a wireless network interface having antenna 885, which may represent one or more antenna(e). Computing system 800 can include multiple wireless network interfaces such as a combination of WiFi, Bluetooth® and cellular telephony interfaces. Network interface(s) 880 may also include, for example, a wired network interface to communicate with remote devices via network cable 887, which may be, for example, an Ethernet cable, a coaxial cable, a fiber optic cable, a serial cable, or a parallel cable.

In one embodiment, network interface(s) 880 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 880 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method, performed on a processing system comprising at least one hardware processor, the method comprising:
   receiving, at a dynamic policy protection engine (DPPE), a backup protection policy having a protection level for an application on a client, the protection level corresponding to a first set of one or more data metrics characterizing a data set generated by the application, wherein the protection level determines a frequency at which a backup of the data set of the application is performed;
   receiving, at the DPPE, a second set of one or more data metrics characterizing the data set generated by the application, the second set of one or more data metrics comprises at least an indicator for a percentage change of the data set for a predefined period of time is above a predefined threshold;
   modifying, by a backup policy update module, the protection level of the application, based at least in part on the second set of one or more data metrics that characterizes the data set generated by the application, wherein modifying comprises increasing or decreasing a frequency interval that the backup of the data set is to be performed;
   scheduling, by the DPPE, a backup of the data set from the client to a backup storage system based on the modified protection level such that a frequency at which the backup of the data set is performed is dependent on the percentage change of the data set for the predefined period of time;
   receiving, at the DPPE, a second backup protection policy having a second protection level associated with a second application on the client, wherein the second backup protection policy differs from the backup protection policy of the first application; and
   scheduling, by the DPPE, a backup of a data set generated by the second application based on the second protection level.

2. The method of claim 1, wherein modifying the protection level of the application comprises one of:
   determining that one of the data metrics exceeds a threshold for the data metric defined by the protection level; or
   determining that one of the data metrics is within a threshold for the data metric defined by a lower protection level of the protection policy.

3. The method of claim 1, further comprising:
   modifying a backup schedule for the application based upon the modified protection level;
   performing a backup of the application of the client in accordance with the modified protection level.

4. The method of claim 1, further comprising:
   modifying the backup protection policy of the application;
   performing a backup of the application of the client in accordance with the modified backup protection policy.

5. The method of claim 1, further comprising discovering one or more applications via an application programming interface (API) hosted on the client, wherein each of the one or more applications includes a backup API that accesses meta data about application data that has been backed up.

6. The method of claim 1, wherein a data metric comprises a size of the data set generated by the application.

7. The method of claim 1, further comprising:
   receiving a second backup protection policy having a second protection level for a second application on the client, wherein at least one of: the second protection level differs from the protection level of the first application, or the second protection level differs from the modified protection level of the first application.

8. A non-transitory computer-readable medium programmed with executable instructions that, when executed by a processing system having at least one hardware processor, perform operations comprising:
   receiving, at a dynamic policy protection engine (DPPE), a backup protection policy having a protection level for an application on a client, the protection level corresponding to a first set of one or more data metrics characterizing a data set generated by the application, wherein the protection level determines a frequency at which a backup of the data set of the application is performed;
   receiving, at the DPPE, a second set of one or more data metrics characterizing a data set generated by the application, the second set of one or more data metrics comprises at least an indicator for a percentage change of the data set for a predefined period of time is above a predefined threshold;
   modifying, by a backup policy update module, the protection level of the application, based at least in part on the second set of one or more data metrics that characterizes the data set generated by the application, wherein modifying comprises increasing or decreasing a frequency interval that the backup of the data set is to be performed;
scheduling, by the DPPE, a backup of the data set from the client to a backup storage system based on the modified protection level such that a frequency at which the backup of the data set is performed is dependent on the percentage change of the data set for the predefined period of time;
receiving, at the DPPE, a second backup protection policy having a second protection level associated wish a second application on the client, wherein the second backup protection policy differs from the backup protection policy of the first application; and
scheduling, by the DPPE, a backup of a data set generated by the second application based on the second protection level.

9. The medium of claim 8, wherein modifying the protection level of the application comprises one of:
determining that one of the data metrics exceeds a threshold for the data metric defined by the protection level; or
determining that one of the data metrics is within a threshold for the data metric defined by a lower protection level of the protection policy.

10. The medium of claim 8, wherein the operations further comprise:
modifying a backup schedule for the application based upon the modified protection level;
performing a backup of the application of the client in accordance with the modified protection level.

11. The medium of claim 8, wherein the operations further comprise:
modifying the backup protection policy of the application;
performing a backup of the application of the client in accordance with the modified protection policy.

12. The medium of claim 8, wherein the operations further comprise discovering one or more applications via an application programming interface (API) hosted on the client, wherein each of the one or more applications includes a backup API that accesses meta data about application data that has been backed up.

13. The medium of claim 8, wherein a data metric comprises a size of the data set generated by the application.

14. The medium of claim 8, wherein the operations further comprise:
receiving a second backup protection policy having a second protection level for a second application on the client, wherein at least one of: the second protection level differs from the protection level of the first application, or the second protection level differs from the modified protection level of the first application.

15. A system comprising:
a processing system having at least one hardware processor, the processing system coupled to a memory programmed with executable instructions that, when executed by the processing system, perform operations comprising:
receiving, at a dynamic policy protection engine (DPPE), a backup protection policy having a protection level for an application on a client, the protection level corresponding to a first set of one or more data metrics characterizing a data set generated by the application, wherein the protection level determines a frequency at which a backup of the data set of the application is performed;
receiving, at the DPPE, a second set of one or more data metrics characterizing a data set generated by the application, the second set of one or more data metrics comprises at least an indicator for a percentage change of the data set for a predefined period of time is above a predefined threshold;
modifying the protection level of the application, based at least in part on the second set of one or more data metrics that characterizes the data set generated by the application, wherein modifying comprises increasing or decreasing a frequency interval that the backup of the data set is to be performed;
scheduling, by the DPPE, a backup of the data set from the client to a backup storage system based on the modified protection level such that a frequency at which the backup of the data set is performed is dependent on the percentage change of the data set for the predefined period of time; and
receiving, at the DPPE, a second backup protection policy having a second protection level associated with a second application on the client, wherein the second backup protection policy differs from the backup protection policy of the first application; and
scheduling, by the DPPE, a backup of a data set generated by the second application based on the second protection level.

16. The system of claim 15, wherein modifying the protection level of the application comprises one of:
determining that one of the data metrics exceeds a threshold for the data metric defined by the protection level; or
determining that one of the data metrics is within a threshold for the data metric defined by a lower protection level of the protection policy.

17. The system of claim 15, wherein the operations further comprise:
modifying a backup schedule for the application based upon the modified protection level;
performing a backup of the application of the client in accordance with the modified protection level.

18. The system of claim 15, wherein the operations further comprise:
modifying the backup protection policy of the application;
performing a backup of the application of the client in accordance with the modified backup protection policy.

19. The system of claim 15, wherein the operations further comprise discovering one or more applications via an application programming interface (API) hosted on the client, wherein each of the one or more applications includes a backup API that accesses meta data about application data that has been backed up.

20. The system of claim 15, wherein a data metric comprises a size of the data set generated by the application.

21. The system of claim 15, wherein the operations further comprise:
receiving a second backup protection policy having a second protection level for a second application on the client, wherein at least one of: the second protection level differs from the protection level of the first application, or the second protection level differs from the modified protection level of the first application.

* * * * *